March 24, 1959  P. W. McWHERTER ET AL  2,879,178
COATED LEATHER PRODUCTS AND METHODS FOR PRODUCING THEM
Filed June 29, 1956

FIG. 1

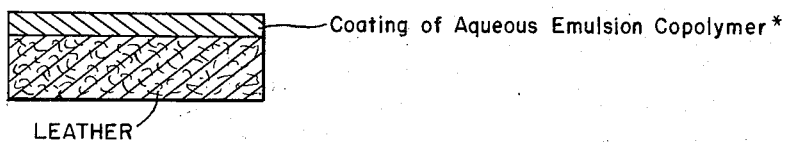
Coating of Aqueous Emulsion Copolymer*
LEATHER

* Copolymer of 3 to 15% of $CH_2=C(R)-A-R'-N(R^2)_2$, where R is H, Cl, or $CH_3$, $R^2$ is H or a saturated aliphatic $C_1$ to $C_{10}$ hydrocarbon group, A is O, S, -COO-, or $-CON(R^2)-$, R' is a $C_2$ to $C_{10}$ alkylene group, and 97 to 85% of a $C_1$ to $C_4$ alkyl ester of acrylic acid, the $T_i$ (second order transition temperature) of the copolymer being $-50°$ C. to $-10°$ C.

FIG. 2

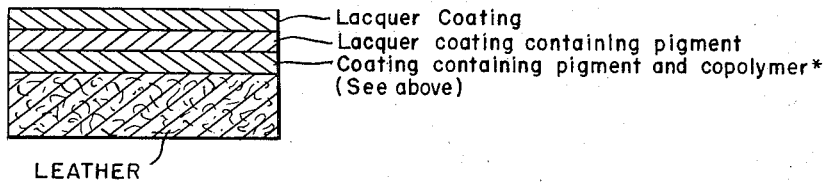
Lacquer Coating
Lacquer coating containing pigment
Coating containing pigment and copolymer*
(See above)
LEATHER

FIG. 3

| Applying to leather an aqueous dispersion containing 10 to 50% of a copolymer (See above) and optionally, a pigment. |

| Drying |

| Optionally, applying a lacquer which may contain a pigment. |

| Drying |

| Optionally applying a second lacquer coating. |

| Drying |

INVENTORS
PAUL W. MC WHERTER,
BENJAMIN B. KINE and
HUGO A. ALPS.

2,879,178

COATED LEATHER PRODUCTS AND METHODS FOR PRODUCING THEM

Paul W. McWherter, Abington, Benjamin B. Kine, Tullytown, and Hugo A. Alps, Southampton, Pa., assignors to Rohm & Haas Company, Philadelphia, Pa., a corporation of Delaware Application June 29, 1956, Serial No. 594,706

22 Claims. (Cl. 117—76)

This invention relates to coated leather products and to processes for producing them. It is particularly concerned with coated leathers having composite multi-layer coatings which have improved adhesion to the leather and to each other and excellent softness and flexibility even under extremes of cold and heat. This application is a continuation-in-part of our copending application Serial No. 495,803, filed March 21, 1955, and now abandoned.

The application of solutions in organic solvents of a film-forming polymer with or without a pigment to form base-coats on leather generally results in a base-coating having an irregular exposed surface. The solvent penetrates and carries both polymer and pigment deeply into the interstices within the fibrous structure of the leather. Since leather generally varies considerably in density throughout its area, and penetration in areas of low density is greater than in areas of higher density, especially in hand-buffed leathers where the surface structure is especially open and porous, the presence of varying amounts of the polymer and pigment within the leather structure detrimentally modifies the leather properties so that the characteristic, desirable feel of the leather is lost. When base coatings are applied from organic solvent solutions, it is difficult to conceal blemishes of leathers, especially of full-grain type, without destroying the leather's appearance and feel. When pigment is carried into the leather by the solvent, the pigment loading effect reduces the flexibility of the leather when cold, such as at temperatures of 0° C. or below, e.g. —10° to —20° C. In solvent coating also, the molecular weight of the polymer is also limited because of the tendency to build up high viscosity when molecular weights over 50,000 are used. The use of a polymer soluble in an organic solvent for the base coat renders this coat more liable to be disturbed by subsequent coating operations carried out with organic solvents.

U. S. Patent 2,204,520 discloses a procedure for applying aqueous dispersions of emulsion-polymerized acrylic acid esters or the like to leathers. Such dispersions in practice are frequently provided with pigments and are generally covered with one or more final lacquer top coats. The aqueous dispersion serves to fill imperfections without the deep penetration occurring when organic solvents are used. Instead, the water is rapidly absorbed by the leather, thereby causing a coagulation of the dispersed polymer particles at or near the outer openings of the interstices in the fibrous leather structure. It is apparently because of this action that the application of such aqueous polymer dispersions deposits a base coating having a substantially even and uniform top surface. This in effect serves to level the surface of the leather and to improve the adhesion between any lacquer top coats applied and the leather. The coatings obtained from the aqueous dispersions disclosed in the patent provide good adhesion to many leathers and particularly to snuffed, buffed, and split leathers. However, on some types of full-grain leathers such coatings have poor adhesion. This poor adhesion is particularly noticeable on leathers which have been subjected to certain types of fatliquoring, such as sperm oil, or which have acquired such a large amount of fatty deposits on the surface of the leather during fatliquoring as to in effect provide a resist to aqueous coating compositions.

It has now been discovered that improved adhesion may be obtained between the leather and polymers applied to it by means of an aqueous vehicle if the polymer contains amino groups. In accordance with the present invention, it has been found that the application of aqueous dispersions of certain resins containing amino groups to the leather provides improved adhesion to full-grain leathers as well as to buffed and split leathers and also improves the resistance to scuffing resulting from rubbing action against the finished leather surface as well as improvements in resistance to wet molding operations.

Figure 1 is a diagrammatic cross-section of one embodiment of a coated leather in accordance with the present invention, the thicknesses, especially of the coating layer, being greatly enlarged; Figure 2 is a diagrammatic cross-section showing another embodiment of a coated leather in accordance with the present invention, the coatings being enlarged in thickness; and Figure 3 is a flow-sheet illustrating a typical process of preparing the coated leathers in accordance with the present invention.

To impart the improved qualities in the finished leathers in accordance with the present invention, the leather is coated with an aqueous dispersion of a water-insoluble linear copolymer, having a value of $T_i$ as defined hereinbelow from —50° C. to —10° C., of monoethylenically unsaturated molecules comprising 3% to 15% by weight of a monomeric compound having the structure of the general Formula I following:

I 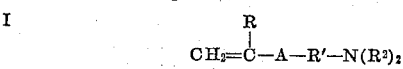

where R is selected from the group consisting of H, Cl, and $CH_3$, $R^2$ is selected from the group consisting of H and saturated aliphatic hydrocarbon groups having from 1 to 10 carbon atoms, A is selected from the group consisting of —O—, S,

and R' is a straight or branched chain alkylene group having from 2 to 10 carbon atoms. Members $R^2$ may be identical or different groups in its several occurrences in any particular compound. A preferred group is that of amines having the Formula II:

II 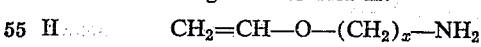

where $x$ may be 2 to 10 but is preferably 2 to 5, the efficiency generally being a maximum when $x$ is 2.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.²

Examples of these monomers of Formula I are: N-(γ-dimethylamino)propyl methacrylate; N-(β-dimethylamino)ethyl acrylamide; N-(β-dimethylamino)ethyl methacrylamide; 10-aminodecyl vinyl ether; 10-aminodecyl vinyl sulfide; 8-aminooctyl vinyl ether; diethylaminohexyl methacrylate; diethylaminoethyl vinyl ether; diethylaminoethyl vinyl sulfide; 5-aminopentyl vinyl ether; 3-aminopropyl vinyl ether; 2-aminoethyl vinyl ether; 2-aminoethyl vinyl sulfide; 2-aminobutyl vinyl ether; 4-aminobutyl vinyl ether; dimethylaminoethyl methacrylate; dimethylaminoethyl vinyl ether; dimethylaminoethyl vinyl sulfide; N-(3,5,5-trimethylhexyl)aminoethyl vinyl ether; N-cyclohexylaminoethyl vinyl ether; β-(t-butylamino)ethyl acrylate; 2-(1,1,3,3-tetramethylbutylamino)ethyl methacrylate; N-t-butylaminoethyl vinyl ether; N-methylaminoethyl vinyl ether; N-2-ethylhexylaminoethyl vinyl ether; N-t-octylaminoethyl vinyl ether.

The copolymers of the present invention formed by emulsion copolymerization have a molecular weight of the order of 500,000 to several million and an average particle size of 2 microns or less and often of 0.5 micron or less. Because of this high molecular weight and partly because of the amino groups, the base coatings of the copolymers remain intact and are not detrimentally affected by the application of subsequent coatings from organic solvent solutions.

The polymers must not be water-soluble. Where the amine-containing monomer that is polymerized is of such character that a homopolymer produced therefrom is appreciably water-soluble, it is necessary to copolymerize such a monomer with at least one other copolymerizable monoethylenically unsaturated monomer which is of a character that will render the final copolymer insoluble in water. Preferred compositions of the invention are, therefore, those copolymers of from 5% to 10% of the amine-containing monomer or of a mixture of such monomers, the balance of the copolymer being formed of other less expensive comonomers. When much more than 15% of the amine-containing monomer is present in the copolymer, it tends to be water-sensitive when the monomer is of a type which would produce a water-soluble homopolymer.

Other polymerizable compounds containing a single ethylenically unsaturated group that may be copolymerized with the amine-containing monomer to produce binary, ternary, etc. copolymers include the esters of acrylic acid or methacrylic acid or the dimer of methacrylic acid with monohydric alcohols such as methyl, ethyl, butyl, octyl, dodecyl, cyclohexyl, cyanoethyl, benzyl, phenylethyl, and the like: diesters of itaconic acid and the above alcohols; esters of maleic, fumaric, or citraconic acids with the above alcohols; vinyl esters of carboxylic acids such as acetic, propionic, butyric, and the like; vinyloxyalkyl esters such as vinyloxyethyl acetate, etc.; vinyl ethers and sulfides such as ethyl vinyl ether, ethyl vinyl sulfide, butyl vinyl ether, octyl vinyl ether; methacrylonitrile or acrylonitrile; acrylamide, or methacrylamide, and N-alkyl-substituted amides of these types; vinyl toluene, vinyl naphthalenes, such as 4-chloro-1-vinyl naphthalene, and styrene.

The emulsifiers or dispersing agents that may be used for preparing the monomer emulsions before copolymerization or dispersions of the polymer after polymerization may be of anionic, cationic, or non-ionic type or a mixture of two types may be used.

Suitable anionic dispersing agents include the higher fatty alcohol sulfates, such as sodium lauryl sulfate, alkylaryl sulfonates, e.g., sodium or potassium isopropylbenzene sulfonates or isopropyl naphthalene sulfonates, alkali metal higher alkyl sulfosuccinates, e.g., sodium octyl sulfosuccinate, sodium N-methyl-N-palmitoyltaurate, sodium oleyl isothionate, alkali metal salts of alkylarylpolyethoxyethanol sulfates or sulfonates, e.g., sodium t-octylphenoxypolyethoxyethyl sulfate having 1 to 5 oxyethylene units.

Suitable cationic dispersion agents include laurylpyridinium chlorides, cetyl dimethyl amine acetate, and alkyldimethylbenzylammonium chlorides in which the alkyl group has from 8 to 18 carbon atoms, such as octyl, decyl, dodecyl or octadecyl, t-octylphenoxyethoxyethoxydimethylbenzylammonium chloride.

Suitable non-ionic dispersing agents include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched chain amines, such as dodecylamine, hexadecylamine, and octadecylamine, containing 6 to 60 oxyethylene groups; block copolymers of ethylene oxide and propylene oxide comprising a hydrophobic propylene oxide section combined with one or more hydrophilic ethylene oxide sections.

Particularly valuable resin dispersions are obtained by emulsifying a mixture of (a) one or more of the amine-containing monomers above and (b) one or more monomeric esters of acrylic, methacrylic, or itaconic acid or mixtures of these acids in water and polymerizing the mixture while it is in the emulsified form. The monomeric esters which have proven to be most satisfactory are the alkyl esters in which the alkyl group contains one to eight carbon atoms and which are exemplified by the following: methyl, ethyl, n-propyl, isopropyl, n-butyl, isobutyl, sec-butyl, tert-butyl, isoamyl, tert-amyl, hexyl, heptyl, n-octyl, and 2-ethylhexyl acrylates, methacrylates, and itaconates.

The polymerizable emulsions can be prepared at temperatures from 0° C. to about 100° C., but intermediate temperatures are much preferred. Thus, when the preferred copolymers with esters are made with the esters in which the alkyl group contains one to four carbon atoms a temperature from about 10° C. to about 60° C. is employed whereas a higher temperature; e.g., 30° C. to 80° C., is recommended when esters containing five to eight carbon atoms in the alkyl group are copolymerized. Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "persalts" such as the alkali metal and ammonium persulfates and perborates, hydrogen peroxide, organic hydroperoxides, such as tert-butyl hydroperoxide and cumene hydroperoxide, and esters such as tert-butyl perbenzoate. Other reducing agents include water-soluble thiosulfates, hydrosulfites, tertiary amines, such as triethanolamine, thiourea, and the salts, such as the sulfates, of metals which are capable of existing in more than one valence state such as cobalt, iron, nickel, and copper. The most convenient method of preparing the dispersions of copolymers comprises agitating an aqueous suspension or emulsion of the mixture of copolymerizable monomers and a redox catalytic combination at room temperature without the application of external heat. The amount of catalyst can vary but for purposes of efficiency from 0.01% to 3.0%, based on the weight of the monomers, of the peroxidic agent and the same or lower proportions of the reducing agent are recommended. In this way, it is possible to prepare dispersions which contain as little as 1% and as much as 60% or even more of the resinous copolymer on a weight basis. It is, however, more practical, and hence preferred, to produce dispersions which contain about 30% to 50% resin-solids.

Preferably a pigment is introduced into the aqueous coating dispersion and the amount of pigment introduced may vary from that equivalent to about 10% to 150% by weight of the polymer. Generally, the pigment is first dispersed in water (to a concentration of about 10% to 70%) by means of a non-ionic or anionic dispersing agent or a mixture of both types thereof. Any of the dispersing agents mentioned above may be used. In addition, a small amount of a protective colloid may be included to thicken and/or stabilize the suspension and prevent the pigment from settling out. Examples of such colloids include methyl cellulose, hydroxyethyl cellulose, polyvinyl alcohol, sodium, potassium or ammonium alginates, ammonium or alkali metal salts of homopolymers and copolymers of acrylic acid, methacrylic acid, itaconic acid, maleic acid, fumaric acid, and the like, such as ammonium polyacrylate, ammonium salts of copolymers of styrene and maleic acid, sodium methacrylate, and so on.

The aqueous dispersion of the polymer or copolymer with or without a pigment dispersed or suspended therein may be applied to the leather at a solids concentration of 10% to 50% (including the weight of polymer and pigment, if any). It may be applied by any suitable equipment such as by brushing, swabbing, or spraying onto the leather. After application of the dispersion, it may be dried on the leather either by drying in the ambient atmosphere or at somewhat elevated temperatures up to 50° C. The amount of copolymer applied on the leather varies widely with the type of leather and the ultimate finish desired. For most purposes, the amount applied per thousand square feet of the leather may vary from 1 to 15 pounds.

It is believed that the improved adhesion obtained on leather by the application of the polymers containing the amino groups is attributable to some chemical or physicochemical reaction between such groups and the protein molecules of the leather or with the tanning agent or fatliquor deposit on the leather, or possibly on some joint reaction with two or more of these substances. However, it is not intended that the invention be limited by any particular theory of operation.

For some purposes, the leather product carrying the single coating obtained from the application of the aqueous dispersion of the polymer containing amino groups with or without pigment may serve as a suitable finished product. For example, this may be the case when it is desired only to impart a water-repellent surface to the leather and the polymer applied by the aqueous dispersion is of highly hydrophobic character either as the result of the presence of a long-chain hydrocarbon group in the amino-containing monomer or as the result of such a long-chain hydrocarbon group in the comonomer or as a result of long-chain hydrocarbon groups in both of such monomers. However, in many cases, it may be desired to apply one or more additional coatings of a lacquer type over the coating obtained from the aqueous polymer dispersion. Any suitable lacquer composition may be applied such as those which comprises as the film-forming material an addition polymer of vinyl, acrylic or related types, a cellulose derivative such as a nitrocellulose or cellulose organic acid esters such as cellulose acetate, cellulose acetate butyrate or the like. The lacquers may comprise a plasticizer if the film-forming agent itself is not adequately flexible. When a single lacquer top coating is applied over the coating obtained from the aqueous polymer dispersion, it may be clear, it may be dulled by a filler or other suitable agent, such as a water-insoluble soap like aluminum stearate, or silicas, or it may be colored with a white or suitably colored pigment. Preferably at least two lacquer top coatings are applied in succession over the coating obtained from the aqueous dispersion. When two such lacquer coatings are applied, the first is preferably pigmented to augment the color and covering obtained by the pigment, if any, applied by the coating from the aqueous dispersion and the second lacquer coating is preferably clear or merely dulled to provide the glossiness or flatness desired in the final surface.

Each of the subsequently applied coatings should be dried before any later coating is to be applied and drying may be effected as before either at normal room temperature in the ambient atmosphere or at somewhat elevated temperatures up to 50° C.

If desired, the leather may be embossed after the coating applied in the aqueous dispersion has been dried on the leather and before subsequent lacquer coatings are applied, or embossing may be applied at any time after subsequent coatings are applied but preferably before the last or final coat is applied. Such embossing should, in all cases, be applied to the coated leather in a dry condition.

As the vinyl or acrylic addition polymer that may be used for the film-forming component of the subsequently applied lacquer or lacquers, there may be used one or more homopolymers or copolymers of the following monoethylenically unsaturated compounds: vinyl chloride, vinyl acetate, vinyl propionate, vinylidene chloride, esters and nitriles of acrylic and methacrylic acids such as acrylonitrile, methacrylonitrile, and the alkyl esters of acrylic or methacrylic acid in which the alkyl group may be methyl, ethyl, propyl, isopropyl, butyl, octyl, dodecyl, hexadecyl and octadecyl. Besides the above homopolymers and copolymers, polyvinyl acetals such as polyvinyl acetal itself, polyvinyl butyral or partially hydrolyzed homopolymers and copolymers of vinyl acetate, vinyl propionate or of acrylic and methacrylic esters may be used. Such compounds contain reactive hydroxyl and carboxyl groups. Other polymers containing reactive groups may be used provided the polymers do not contain sufficient reactive groups to render them insoluble in the organic solvent employed. Such polymers include the copolymers containing up to 50 mole percent of β-hydroxyethyl vinyl ether or of β-hydroxypentyl vinyl ether, up to 50 mole percent of aminoethyl acrylate, aminoethyl vinyl ether or N-methyl- or N-ethylaminoethyl vinyl ether, or up to 30 mole percent of a vinyl pyridine, such as 2-vinyl pyridine, or 4-vinyl pyridine, or of an amide, such as acrylamide, methacrylamide, N-methyl acrylamide, or of an acid, such an acrylic acid, methacrylic acid, itaconic acid, crotonic acid, maleic acid, and the dimer or trimer of methacrylic acid, or the like.

When a plasticizer is used, it may be a polyester, polyamide, or polyester amide such as may be obtained by the condensation reaction of a dibasic acid with a polyol or a polyamine. More particularly, the plasticizer (which may be termed a "polymeric" plasticizer) may be obtained by reacting combinations of materials of the general types noted below:

I  Glycols (or other polyols) and dibasic acids
II  Amino alcohols and dibasic acids
III  Glycols, diamines and dibasic acids
IV  Glycols, amino alcohols and dibasic acids
V  Amino alcohols, diamines and dibasic acids
VI  Amino acids, glycols and dibasic acids
VII  Amino acids, amino alcohols and dibasic acids
VIII  Amino alcohols, glycols and dibasic acids
IX  Amino alcohols, dibasic acids and hydroxycarboxylic acids It is advantageous to use a small excess of the alcoholic-hydroxyl-containing constituent in preparing the polymers.

Examples of polyols include trimethylol methane and erythritol. Examples of glycols are ethyleneglycol, propyleneglycol, diethyleneglycol, trimethyleneglycol, pentamethyleneglycol, hexamethyleneglycol, decamethyleneglycol, dodecamethyleneglycol, 1:12-octadecanediol and pentaglycol.

Examples of dibasic carboxylic acids are malonic, succinic, glutaric, adipic, β-methyladipic, pimelic, suberic, azelaic, sebacic, undecanedioic, brassylic, isophthalic, hexahydroterephthalic, p-phenylene-diacetic and acetone-dicarboxylic acid.

Any amino alcohol having at least one hydrogen atom attached to the amino nitrogen atom may be employed including aromatic amino alcohols, e. g., p-hydroxymethylbenzylamine, 4-hydroxymethyl-4-aminomethyldiphenyl and p-aminophenylethyl alcohols; aliphatic amino alcohols, e. g., 5-aminopentanol-1:6-amino-5-methylhexanol-1,4(p-aminophenyl)cyclohexanol, hydroxyethoxyethoxyethylamine, and N-(β-aminoethyl)-N-(omega-hydroxyhexyl)-aniline.

The preferred amino alcohols are of formula

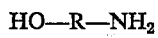

HO—R—NH₂ where R represents saturated divalent hydrocarbon radicals with a chain length of at least two carbon atoms. Amino alcohols which fall within this group include ethanolamine, 3-aminopropanol, 4-aminobutanol, 6-aminohexanol, and 10-aminodecanol.

Any diamine may be employed, which contains at least one hydrogen atom attached to each amino nitrogen atom. The preferred diamines are of formula NH₂RHN₂ where R represents saturated divalent hydrocarbon radicals with a chain length of at least two carbon atoms, e. g., ethylenediamine, hexamethylenediamine, 3-methylhexamethylenediamine, and decamethylenediamine. However, aromatic diamines such as m-phenylenediamine may also be used.

Any polymerizable monohydroxy monocarboxylic acid or ester-forming derivative thereof may be employed. The preferred hydroxy-acids are of formula

HO—R—COOH where R represents saturated divalent hydrocarbon radicals, e. g., 6-hydroxycaproic, 10-hydroxydecanoic, and 12-hydroxystearic acid.

Any polymerizable monoaminomonocarboxylic acid or ester-forming derivative thereof may be employed including 6-aminocaproic, 9-aminononanoic, and 11-aminoundecanoic, and 12-aminostearic acids, caprolactum, etc.

The organic solvents that may be used include ketones such as acetone, methyl ethyl ketone and dioxane; hydrocarbons such as xylene, toluene, benzene, as well as paraffinic or naphthenic types, such as solvent naphthas, esters such as ethyl, propyl, butyl, and amyl acetate as well as ethoxyethyl acetate, butoxyethyl acetate and the like, or ethers such as butyl ethyl ether. The solvent may comprise a mixture of several types. If a polyisocyanate is used as suggested hereinafter, a solvent should be of a type which does not contain an active hydrogen.

The pigments that may be employed in the lacquers or the aqueous copolymer dispersion or in both of these media include red iron oxide, chrome green, molybdate chrome orange, phthalocyanines, such as copper phthalocyanine, titanium dioxide, lithopone, chrome yellow, ultramarine blue, red cadmium, yellow cadmium, organic toners and lakes, and so on.

It has been found that the adhesion between the leather and the coating thereon, especially when several layers are applied to the leather, is even further improved when a polyisocyanate is applied to the coated leather in the vapor or liquid state at any time after the aqueous polymer dispersion has been dried on the leather. For example, the polyisocyanate may be applied by spraying or swabbing over the dried polymer coating obtained from the aqueous dispersion. It may also be applied as a component in any of the subsequently applied lacquers or it may be applied to the dried coated leather after any of the subsequently applied lacquers. Preferably, if a polyisocyanate is employed, it is incorporated in the first lacquer coating applied over the polymer coating obtained from the aqueous dispersion.

Examples of the polyisocyanates that may be employed include especially the hydrocarbon polyisocyanates such as ethylene diisocyanate, trimethylene diisocyanate, tetramethylene diisocyanate, hexamethylene disocyanate, decamethylene diisocyanate, p-phenylene diisocyanate, m-phenylene diisocyanate, naphthalene diisocyanates, benzene 1:3:5-triisocyanate, toluene-2:4:6-triisocyanate, ethylbenzene-2:4:6-triisocyanate, monochlorobenzene-2:4:6-triisocyanate, triphenylmethane-4:4':4'''-triisocyanate and diphenyl - 2:4:4' - triisocyanate, toluene - 2,4 - diisocyanate, 4,4'-diisocyanato-biphenyl, 3,3'-dimethyl-4,4'-diisocyanato-biphenyl, and 3,3'-dimethoxy-4,4'-diisocyanato biphenyl. The polyisocyanates have various reactivities, some being much slower than others. For example, diphenylmethane-4,4'-diisocyanate is highly reactive whereas the 3,3'-dimethoxy-4,4'-diisocyanato-biphenyl is relatively slow. To compensate for the difference in reactivity, the proportion added may be increased for the slower ones and decreased for the faster ones or basic catalysts, such as tertiary amines may be included, especially with the slower ones. Mixtures of the polyisocyanates may be used of which preferred combinations are mixtures of toluene-2,4-diisocyanate with either 3,3'-dimethyl-4,4'-diisocyanato-biphenyl or 3,3'-dimethoxy-4,4'-diisocyanato-biphenyl.

When one or more lacquer coatings are to be applied after the application of the polyisocyanate, it is preferred that the drying of the polyisocyanate in place on the coated leather should not be so prolonged or at such high temperatures that all the isocyanate groups are completely reacted. By so leaving the active isocyanate groups the drying of subsequent lacquer coatings provides the opportunity for reactive combination of isocyanate groups with any reactive groups that may be present in such subsequently applied lacquers.

It appears that, when a polyisocyanate is used, the improved adhesion between the several layers of the coating and between the leather is at least partially attributable to some reaction between the polyisocyanate, the leather, the film-forming component and possibly the plasticizer in the several coatings. It should be understood, however, that the application to the leather of the aqueous dispersions of polymers containing amino groups as defined hereinabove imparts improved adhesion between lacquer coatings and the leather and shows improved adhesion between the leather and the polymer deposited from the aqueous dispersion. This adhesion is for most purposes fully adequate even without the employment of a polyisocyanate. The application of the polyisocyanate, however, may be desirable to obtain even better adhesion for some particular purposes and has also the advantages of increasing the dryness or slipperiness of the top surface of the coated leather. When two lacquer coats are applied over the coating obtained from the aqueous polymer dispersion, the first of such lacquers preferably has the following composition: from 20 to 200 parts by weight of plasticizer, if present, per 100 parts of the addition polymer or cellulose ester; from 5 to 150 parts by weight of a pigment or mixture of pigments per 100 parts of the film-forming component; from 1% to 65% by weight of a polyisocyanate, if used, this percentage being based on the sum of the weights of the plasticizer and film-forming component. The amount of solvent employed may be such as to provide a solids concentration (that is materials other than the solvent themselves) of 2% to 20% by weight. The final lacquer coat is usually an unpigmented solution (either clear or dulled by an inert delustering filler) of the plasticizer and film-forming component, either or both of which may be the same as or different from the respective plasticizer and film-forming component of the first lacquer coat. When both lacquer coats contain plasticizer, the proportion in the final coating is somewhat less in proportion to the film-forming component than the proportion used in the first lacquer coating. Generally, it is within the proportion of 15 to 80 parts per 100 parts of the film-forming component.

In the following examples, which are illustrative of the invention, parts and percentages are by weight unless otherwise noted.

Example 1

(a) A dispersion of a copolymer was prepared by emulsifying 95 parts by weight of ethyl acrylate with 5 parts by weight of 2-aminoethyl vinyl ether in about 300 parts by weight of water with about 2 parts by weight of sodium lauryl sulfate and 6 parts by weight of an ethylene oxide condensation product of an octyl phenol containing between 30 and 50 oxyethylene units per molecule. To the emulsified monomers 0.3% by weight of ammonium persulfate, 0.06% of sodium hydrosulfite, and 1% triethanolamine were added to catalyze the copolymerization which was carried out for a period of about fifteen minutes during which the temperature rose from 20° C. to 45° C.

(b) Nine parts of red iron oxide are dispersed in 14 parts of water by means of two parts of a suitable dispersing agent, such as a mixture of equal parts of sodium lauryl sulfate and t-octylphenoxypolyethoxyethanol containing about 10 oxyethylene units in combination with ½ part of a suitable protective colloid, such as methyl cellulose, and the mixture was added to 100 parts of the copolymer dispersion of part (a) hereof. The resulting pigmented dispersion was swabbed on several pieces of a full grain upholstery leather and dried at 50° C. The coating exhibited excellent adhesion to the leather.

(c) The procedure of parts (a) and (b) hereof is repeated except the 2-aminoethyl vinyl ether is omitted so that a dispersion of a homopolymer of ethyl acrylate is produced and applied to the full grain upholstery leather. The coating on the leather could be pulled off the leather intact.

Example 2

(a) A mixture of 40 parts of red iron oxide, six parts of a plasticizer consisting of a polyester obtained by the reaction of sebacic acid with an excess of propyleneglycol and having a number average molecular weight of about 4,000, 2.9 parts by weight of a copolymer of 90% vinyl chloride and 10% vinyl acetate having a number average molecular weight of about 40,000, 6.1 parts ethoxyethyl acetate, 25 parts of methyl ethyl ketone, and 20 parts of a petroleum solvent consisting of a mixture of aromatic, naphthenic, and aliphatic hydrocarbons is ground in a ball mill for 24 hours to form a pigment dispersion.

(b) A solution is also formed from 3.1 parts of the same plasticizer as above and 5.0 parts of the same vinyl copolymer in 10 parts of ethoxyethyl acetate, 44 parts of methyl ethyl ketone and 34.9 parts of a hydrocarbon solvent largely consisting of xylol.

(c) The solution of part (b) hereof is then mixed with the milled pigment dispersion of part (a) hereof in the ratio of 90 parts of the former to 10 parts of the latter. The resulting dispersion is applied to a piece of the coated leather obtained in part (b) of Example 1 and dried at 50° C. for about three hours.

(d) Then a clear coating is applied to the coated leather obtained in part (c) hereof by spraying a solution containing about 1.5% of the same plasticizer (of part (a)) and 5% of the same vinyl copolymer (of part (a)) in a solvent mixture composed of 10% of ethoxyethyl acetate, 55% methyl ethyl ketone and 35% of a hydrocarbon composed largely of xylene. After applying the clear coating by spraying, it was dried at 50° C. The final coated leather had a glossy color, and was soft and flexible.

Example 3

(a) The procedure of Example 2, parts (a) through (d) is repeated except that 3.0 parts of toluene-2,4-diisocyanate is added to the solution of part (b) thereof. The resulting leather has a drier feel, shows excellent adhesion between the coatings and also between the leather and the several coatings, and is even more resistant to wet molding operations than that obtained without the diisocyanate in part (b) of Example 1.

(b) The procedure of Example 2, parts (a) through (d) is repeated except that 3.0 parts of toluene-2,4-diisocyanate is added to the solution of part (b) thereof and the dispersion obtained in part (c) thereof is applied to the leather obtained in part (c) of Example 1 wherein the full grain upholstery leather is coated with a homopolymer of ethyl acrylate. The adhesion of the coatings to the leather is fair but special precautions are needed during wet molding operations to prevent damage to the finished leather.

Example 4

(a) The procedure of Example 1, parts (a) and (b) is repeated except that the monomers are replaced with 80 parts by weight of ethyl acrylate, 15 parts by weight of n-butyl acrylate and 5 parts of dimethylaminoethyl vinyl ether. The dried leather showed excellent adhesion between itself and the coatings.

(b) To the coated leather obtained from part (a) hereof there is applied two lacquer coatings of the same composition as and by the procedure of parts (a) through (d) of Example 2. Excellent adhesion is obtained between the lacquer coatings and the leather.

Example 5

(a) The procedure of part (a) of Example 4 is repeated except that the five parts of dimethylaminoethyl vinyl ether are replaced with five parts of dimethylaminoethyl vinyl sulfide. Good adhesion of the coating to the leather was obtained.

(b) The coated leather obtained in part (a) hereof has applied to it the two lacquer coatings of parts (a) to (d) inclusive of Example 2, the application being made by the procedure of Example 2.

Example 6

(a) The procedure of Example 4(a) is repeated except that the five parts of dimethylaminoethyl vinyl ether are replaced with five parts of dimethylaminoethyl methacrylate. Good adhesion is obtained between the coating and the leather.

(b) The product obtained from part (a) hereof is top-coated as in Example 2, parts (a) to (d) inclusive. Again good adhesion is obtained.

Example 7

(a) A dispersion containing 15% of a copolymer of 85% n-butyl acrylate with 15% N-(γ-dimethylamino)-propyl methacrylamide is pigmented as in Example 1(b), applied to a full grain leather, and dried as in Example 1(b). Good adhesion between the coating and the leather is obtained.

(b) The coated leather is top-coated as in parts (a) through (d) of Example 2. The coated leather shows good adhesion between the lacquer coating and the leather.

Example 8

(a) An aqueous dispersion containing 20% of a copolymer of 85 parts by weight of ethyl acrylate and 15 parts by weight of t-butylaminoethyl acrylate is pigmented as in Example 1(b) except the red iron oxide is replaced with molybdate chrome orange. After application to the leather and drying as in Example 1(b), the coating shows good adhesion to the leather.

(b) The coated leather of part (a) hereof is top-coated as in Example 2, parts (a) through (d) except that the red iron oxide is replaced with molybdate chrome orange. The coated leather exhibited good adhesion between the lacquer coatings and the leather.

*Example 9*

An aqueous dispersion containing 20% by weight of a copolymer of 85 parts by weight of ethyl acrylate with 15 parts by weight of 8-aminooctyl vinyl ether is applied to a full grain leather in the manner described under Example 1, parts (a) and (b) after pigmenting according to that procedure.

*Example 10*

An aqueous dispersion containing 30% by weight of a copolymer of 90 parts of diethyl itaconate with 10 parts by weight of N-cyclohexylaminoethyl vinyl ether is pigmented and applied to a full grain leather in the manner described in Example 1, parts (a) and (b).

The application of an aqueous dispersion of a polymer to a leather for the purpose of coating it avoids excessive impregnation of the leather which sometimes occurs when a polymer is applied from an organic solvent solution thereof. It, therefore, avoids the stiffening and the undesirable break and feel of the coated product that are caused by severe impregnation. At the same time, the application of the aqueous dispersion of the polymer has the advantage of enabling the operator to apply the composition containing a large proportion of solids therein without encountering the disadvantages of high viscosity and low mobility which would be encountered if the polymer were applied by the use of an organic solvent solution. In addition, the application of the particular polymers of the present invention by an aqueous dispersion provides improved adhesion for many types of leather, particularly those which have a large amount of fatty deposits on the surface of the leather as a result of the fat-liquoring operations. When lacquer top coatings are applied over the coating applied from the aqueous dispersion of the particular polymers of the invention, improved adhesion is obtained between the lacquer top coating system and the leather as compared to that obtained with polymers heretofore suggested to be applied by aqueous dispersion which contain no amino groups.

It is to be understood that changes and variations may be made without departing from the spirit and scope of the invention as defined in the appended claims.

We claim:

1. As an article of manufacture, a leather having a coating thereon comprising a water-insoluble linear polymer, having an apparent second order transition temperature from $-50°$ C. to $-10°$ C., of monoethylenically unsaturated molecules comprising 3 to 15% by weight of a monomeric compound having the structure of the formula I 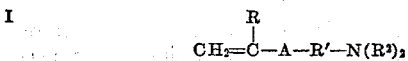

where R is selected from the group consisting of H, Cl, and $CH_3$, $R^2$ is selected from the group consisting of H and saturated aliphatic hydrocarbon groups having from 1 to 10 carbon atoms, A is selected from the group consisting of —O—, S,

and

and R' is selected from the group consisting of straight and branched chain alkylene groups having from 2 to 10 carbon atoms, and 97 to 85% respectively of at least one alkyl ester of acrylic acid in which the alkyl group has 1 to 4 carbon atoms, the amount of polymer in the coating being from 1 to 15 pounds per thousand square feet of the leather.

2. As an article of manufacture, a leather having a coating thereon comprising a water-insoluble linear polymer, having an apparent second order transition temperature from $-50°$ C. to $-10°$ C., of monoethylenically unsaturated molecules comprising 3 to 15% by weight of dimethylaminoethyl vinyl ether and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather.

3. As an article of manufacture, a leather having a coating thereon comprising a water-insoluble linear polymer, having an apparent second order transition temperature from $-50°$ C. to $-10°$ C., of monoethylenically unsaturated molecules comprising 3 to 15% by weight of dimethylaminoethyl vinyl sulfide and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather.

4. As an article of manufacture, a leather having a coating thereon comprising a water-insoluble linear polymer, having an apparent second order transition temperature from $-50°$ C. to $-10°$ C., of monoethylenically unsaturated molecules comprising 3 to 15% by weight of dimethylaminoethyl methacrylate and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather.

5. As an article of manufacture, a leather having a coating thereon comprising a water-insoluble linear polymer, having an apparent second order transition temperature from $-50°$ C. to $-10°$ C., of monethylenically unsaturated molecules comprising 3 to 15% by weight of 2-aminoethyl vinyl ether and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather.

6. As an article of manufacture, a leather having a coating thereon comprising a water-insoluble linear polymer, having an apparent second order transition temperature from $-50°$ C. to $-10°$ C., of monethylenically unsaturated molecules comprising 3 to 15% by weight of N-($\gamma$-dimethylamino)propyl methacrylamide and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather.

7. As an article of manufacture, a leather having a multi-layer coating thereon, one layer of which comprises a pigmented water-insoluble linear polymer, having an apparent second order transition temperature from $-50°$ C. to $-10°$ C., of monoethylenically unsaturated molecules comprising 3 to 15% by weight of a monomeric compound having the structure of Formula I as defined in claim 1 and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather, and, superimposed on said layer, at least one lacquer coating comprising a film-forming component.

8. As an article of manufacture, a leather having a multi-layer coating thereon, one layer of which comprises a pigmented water-insoluble linear polymer, having an apparent second order transition temperature from —50° C. to —10° C., of monoethylenically unsaturated molecules comprising 3 to 15% by weight of a monomeric compound having the structure of Formula I as defined in claim 1 and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather, and, superimposed on said layer, two lacquer coatings the first of which is pigmented.

9. As an article of manufacture, a leather having a multi-layer coating thereon, one layer of which comprises a pigmented water-insoluble linear polymer, having an apparent second order transition temperature from —50° C. to —10° C., of about 3 to 15% by weight of dimethylaminoethyl vinyl ether and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather, and, superimposed on said layer, a pigmented lacquer coating comprising a vinyl resin and a plasticizer for the vinyl resin.

10. As an article of manufacture, a leather having a multi-layer coating thereon, one layer of which comprises a pigmented water-insoluble linear polymer, having an apparent second order transition temperature from —50° C. to —10° C., of about 3 to 15% by weight of dimethylaminoethyl vinyl sulfide and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather, and, superimposed on said layer, a pigmented lacquer coating comprising a vinyl resin and a plasticizer for the vinyl resin.

11. As an article of manufacture, a leather having a multi-layer coating thereon, one layer of which comprises a pigmented water-insoluble linear polymer, having an apparent second order transition temperature from —50° C. to —10° C., of about 3 to 15% by weight of dimethylaminoethyl methacrylate and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather, and, superimposed on said layer, a pigmented lacquer coating comprising a vinyl resin and a plasticizer for the vinyl resin.

12. As an article of manufacture, a leather having a multi-layer coating thereon, one layer of which comprises a pigmented water-insoluble linear polymer, having an apparent second order transition temperature from —50° C. to —10° C., of about 3 to 15% by weight of 2-aminoethyl vinyl ether and 97 to 85% respectively of at least one alkyl ester of acrylic acid in which the alkyl group has 1 to 4 carbon atoms, said coating containing 10 to 150% by weight, based on the weight of the polymer, of a pigment, the amount of polymer in the coating being from 1 to 15 pounds per thousand square feet of the leather, and, superimposed on said layer, a pigmented lacquer coating comprising a vinyl resin and a plasticizer for the vinyl resin.

13. The method of finishing leather comprising applying thereto an aqueous dispersion containing 10 to 50% total solids comprising a water-insoluble linear polymer, having an apparent second order transition temperature from —50° C. to —10° C., of monoethylenically unsaturated molecules comprising 3 to 15% by weight of a monomeric compound having the structure of Formula I as defined in claim 1 and 97 to 85% respectively of at least one alkyl ester of acrylic acid in which the alkyl group has 1 to 4 carbon atoms, said dispersion containing 10 to 150% by weight, based on the weight of the polymer, of a pigment, and then drying the coated leather.

14. The method of finishing leather comprising applying thereto an aqueous dispersion containing 10 to 50% solids comprising a water-insoluble linear polymer, having an apparent second order transition temperature from —50° C. to —10° C., of 3 to 15% by weight of dimethylaminoethyl vinyl ether and 97 to 85% respectively of at least one alkyl ester of acrylic acid in which the alkyl group has 1 to 4 carbon atoms, and then drying the coated leather.

15. The method of finishing leather comprising applying thereto an aqueous dispersion containing 10 to 50% solids comprising a water-insoluble linear polymer, having an apparent second order transition temperature from —50° C. to —10° C., of 3 to 15% by weight of dimethylaminoethyl vinyl sulfide and 97 to 85% respectively of at least one alkyl ester of acrylic acid in which the alkyl group has 1 to 4 carbon atoms, and then drying the coated leather.

16. The method of finishing leather comprising applying thereto an aqueous dispersion containing 10 to 50% total solids comprising a water-insoluble linear polymer, having an apparent second order transistion temperature from —50° C. to —10° C., of 3 to 15% by weight of dimethylaminoethyl methacrylate and 97 to 85% respectively of at least one alkyl ester of acrylic acid in which the alkyl group has 1 to 4 carbon atoms, said dispersion containing 10 to 150% by weight, based on the weight of the polymer, of a pigment, and then drying the coated leather.

17. The method of finishing leather comprising applying thereto an aqueous dispersion containing 10 to 50% total solids comprising a water-insoluble linear polymer, having an apparent second order transition temperature from —50° C. to —10° C., of monoethylenically unsaturated molecules comprising 3 to 15% by weight of a monomeric compound having the structure of Formula I as defined in claim 1 and 97 to 85% respectively of at least one alkyl ester of acrylic acid in which the alkyl group has 1 to 4 carbon atoms, said dispersion containing 10 to 150% by weight, based on the weight of the polymer, of a pigment, then drying the coated leather, applying thereto a lacquer, at least one of said dispersion and lacquer being pigmented, and drying the lacquer.

18. As an article of manufacture, a full-grain upholstery leather having a coating thereon comprising a water-insoluble linear copolymer, having an apparent second order transition temperature from —50° C. to —10° C., of (1) 85 to 97% by weight of at least one alkyl ester of acrylic acid in which the alkyl group has 1 to 4 carbon atoms and (2) 3 to 15% by weight of a compound of Formula I as defined in claim 1, said coating containing 10 to 150% by weight, based on the weight of the polymer, of a pigment, the amount of polymer in the coating being from 1 to 15 pounds per thousand square feet of the leather.

19. As an article of manufacture, a full-grain upholstery leather having a coating thereon comprising a water-insoluble linear copolymer, having an apparent second order transition temperature from —50° C. to —10° C., of (1) 85 to 97% by weight of at least one alkyl ester of acrylic acid in which the alkyl group has 1 to 4 carbon atoms and (2) 3 to 15% by weight of dimethylaminoethyl methacrylate, said coating containing 10 to 150% by weight, based on the weight of the polymer, of a pigment, the amount of polymer in the coating being from 1 to 15 pounds per thousand square feet of the leather.

20. As an article of manufacture, a full-grain leather having a coating thereon comprising a water-insoluble linear copolymer, having an apparent second order transition temperature from −50° C. to −10° C., of (1) 85 to 97% by weight of at least one alkyl ester of acrylic acid in which the alkyl group has 1 to 4 carbon atoms and (2) 3 to 15% by weight of a compound of Formula I as defined in claim 1, said coating containing 10 to 150% by weight, based on the weight of the polymer, of a pigment, the amount of polymer in the coating being from 1 to 15 pounds per thousand square feet of the leather.

21. As an article of manufacture, a full-grain leather having a coating thereon comprising a water-insoluble linear copolymer, having an apparent second order transition temperature from −50° C. to −10° C., of (1) 85 to 97% by weight of at least one alkyl ester of acrylic acid in which the alkyl group has 1 to 4 carbon atoms and (2) 3 to 15% by weight of dimethylaminoethyl methacrylate, said coating containing 10 to 150% by weight, based on the weight of the polymer, of a pigment, the amount of polymer in the coating being from 1 to 15 pounds per thousand square feet of the leather.

22. The method of finishing full-grain leather comprising applying thereto an aqueous dispersion containing 10 to 50% total solids comprising a water-insoluble linear polymer, having an apparent second order transition temperature from −50° C. to −10° C., of monoethylenically unsaturated molecules comprising (1) 85 to 97% by weight of an alkyl ester of acrylic acid in which the alkyl group has 1 to 4 carbon atoms and (2) 3 to 15% by weight of a monomeric compound having the structure of Formula I as defined in claim 1, said dispersion containing 10 to 150% by weight, based on the weight of the polymer, of a pigment, and then drying the coated leather.

References Cited in the file of this patent
UNITED STATES PATENTS

| | | |
|---|---|---|
| 2,126,321 | Freudenberg et al. | Aug. 9, 1938 |
| 2,129,694 | Izard | Sept. 13, 1938 |
| 2,138,031 | Graves | Nov. 29, 1938 |
| 2,138,762 | Harman | Nov. 29, 1938 |
| 2,138,763 | Graves | Nov. 29, 1938 |
| 2,204,520 | Walker et al. | June 11, 1940 |
| 2,356,879 | Pense et al. | Aug. 29, 1944 |
| 2,430,479 | Pratt et al. | Nov. 11, 1947 |
| 2,744,836 | Schubert et al. | May 8, 1956 |